(12) United States Patent  (10) Patent No.: US 9,020,204 B2
Modén  (45) Date of Patent: Apr. 28, 2015

(54) METHOD AND AN APPARATUS FOR IMAGE-BASED NAVIGATION

(75) Inventor: Anders Modén, Nässjö (SE)

(73) Assignee: SAAB AB, Linkoeping (SE)

( * ) Notice: Subject to any disclaimer, the term of this patent is extended or adjusted under 35 U.S.C. 154(b) by 218 days.

(21) Appl. No.: 13/876,823

(22) PCT Filed: Oct. 1, 2010

(86) PCT No.: PCT/SE2010/051059
§ 371 (c)(1),
(2), (4) Date: May 3, 2013

(87) PCT Pub. No.: WO2012/044218
PCT Pub. Date: Apr. 5, 2012

(65) Prior Publication Data
US 2013/0322698 A1  Dec. 5, 2013

(51) Int. Cl.
*G06K 9/00* (2006.01)
*G06T 7/20* (2006.01)
*G06T 7/00* (2006.01)

(52) U.S. Cl.
CPC ............. *G06T 7/2033* (2013.01); *G06T 7/0048* (2013.01); *G06T 7/2086* (2013.01); *G06T 2207/10012* (2013.01); *G06T 2207/20076* (2013.01); *G06T 2207/30244* (2013.01)

(58) Field of Classification Search
USPC .......................................................... 382/107
See application file for complete search history.

(56) References Cited

U.S. PATENT DOCUMENTS

| 6,137,491 | A | * | 10/2000 | Szeliski | ........................ 345/419 |
| 2004/0213452 | A1 | | 10/2004 | Seo et al. | |
| 2006/0241432 | A1 | * | 10/2006 | Herline et al. | ................ 600/437 |
| 2007/0081709 | A1 | * | 4/2007 | Warmath et al. | .............. 382/128 |
| 2008/0273751 | A1 | | 11/2008 | Yuan et al. | |
| 2009/0021614 | A1 | | 1/2009 | Baker et al. | |

FOREIGN PATENT DOCUMENTS

WO  WO 2012/044217 A  4/2012

OTHER PUBLICATIONS

European Patent Office, Extended European Search Report for Application No. 10857956.6, Apr. 22, 2014, 7 pages, Germany.

(Continued)

*Primary Examiner* — Gregory F Cunningham
(74) *Attorney, Agent, or Firm* — Alston & Bird LLP

(57) ABSTRACT

A method and apparatus for determining position and orientation enabling navigation of an object using image data from at least a first and a second 2D image from at least one camera mounted on said object. The method comprises the steps of: correcting images from one or several cameras and from at least a first and a second 2D image for their respective radial distortion and other measurable effects which result in poor image precision; matching 2D image items in and between at least a first and second 2D image; calculating a fundamental matrix by using correlated image points from at least a first and a second 2D image; calculating and extracting estimated first rotation and translation values from the fundamental matrix using single value decomposition (SVD) based on information from at least a first and a second 2D image; iterating more accurate final rotation and translation values by using the LevenBerg-Marquard algorithm and determining the position and orientation of said object.

9 Claims, 6 Drawing Sheets

(56) References Cited

OTHER PUBLICATIONS

International Searching Authority, International Search Report and Written Opinion for International Application No. PCT/SE2010/051059, mailed Jun. 21, 2011, 12 pages, Swedish Patent and Registration Office, Sweden.

Saab AB, Applicant's Response to the Jun. 21, 2011 Written Opinion of the International Searching Authority for International Application No. PCT/SE2010/051059, Jul. 25, 2012, 13 pages, Albihns.Zacco AB, Sweden.

International Preliminary Examining Authority, International Preliminary Report on Patentability for International Application No. PCT/SE2010/051059, report completed Aug. 28, 2012, Swedish Patent and Registration Office, Sweden.

Lin, Huei-Yung, Lin, Jen-Hung, and Wang, Ming-Liang, "A Visual Positioning System for Vehicle Navigation," In the Proceedings of the 8$^{th}$ International IEEE Conference on Intelligent Transportation Systems, 6 pages, Sep. 13-16, 2005, Vienna, Austria.

International Searching Authority, International Search Report and Written Opinion for International Application No. PCT/SE2010/051058, mailed Jun. 21, 2011, 13 pages, Swedish Patent and Registration Office, Sweden.

Carceroni, Rodrigo L., Pádua, Flávio L.C., and Santos, Geraldo A.M.R., "Linear Sequence-to-Sequence Alignment," In the Proceedings of the 2004 IEEE Computer Society Conference on Computer Vision and Pattern Recognition (CVPR'04), 8 pages, Jun. 27-Jul. 2, 2004, Washington.

López-Nicolás, G., et al., "Multiple Homographies With Omnidirectional Vision for Robot Homing," Robotics and Autonomous Systems, vol. 58, No. 6, pp. 773-783, 2010.

\* cited by examiner

METHOD AND AN APPARATUS FOR IMAGE-BASED NAVIGATION

CROSS REFERENCE TO RELATED APPLICATIONS

This application is a national stage application, filed under 35 U.S.C. §371, of International Application No. PCT/SE2010/051059, filed Oct. 1, 2010, the contents of which is hereby incorporated by reference in its entirety.

BACKGROUND OF THE INVENTION

1. Related Field

The present invention relates to the field of epipolar geometry, the intrinsic geometry between two views, or images, encapsulated by the fundamental matrix. The present invention relates to a method and apparatus for solving position and orientation from correlated point features in images using an optimized fundamental matrix from which rotation and translation are simultaneously calculated and iterated.

The present invention is related to the fields of object guidance and navigation, and more particularly, to systems and techniques for guiding and providing navigation to an object using image data.

The present invention relates to a method for determining position and orientation enabling navigation of an object using image data from at least a first and a second 2D image from at least one camera mounted on said object.

The present invention further relates to an apparatus for determining position and orientation enabling navigation of an object using image data from at least a first and a second 2D image from at least one camera mounted on said object, wherein said apparatus comprising a memory and a processor.

2. Description of Related Art

There exist various examples of methods and apparatus for navigation. Today, land-, sea or air based navigational data information of position and orientation is usually provided by a Global Positioning System (GPS). GPS is a space-based global navigation satellite system that provides location and time information in all weather and at all times and anywhere on or near the Earth when and where there is an unobstructed line of sight to four or more GPS satellites. GPS, however, has several restrictions and vulnerabilities due to unintentional or deliberate interference with GPS signals. Unintentional interference is, for example, ionosphere interference and radio frequency interference stemming from television broadcasts, VHF signals, cell phones, and two-way pagers. GPS are also susceptible to jamming and multipath and integrity problems. Further, GPS is restricted to an unobstructed line of sight to the GPS satellites and are thereby lacking the ability to reliably and correctly provide navigational data information of position and orientation indoors and in large urban cities or in any other location where the line of sight is obstructed.

Inertial Navigation Systems (INS) is also widely used for navigation and guidance. An INS uses the inertial properties of an objects sensors, for example sensors onboard a vehicle or attached to a person, to determine an object's position and velocity. This is accomplished by processing data obtained from specific force and angular velocity measurements. These navigational systems use accelerometers and gyroscopes to obtain navigational data information. A weakness of using INS, however, is that they can drift over time, which may result in added errors to position estimates. Further, INS is restricted to using gyroscopes and accelerometers which are both expensive and heavy equipments.

The advancements in computer vision and epipolar geometry have increased interest in image based navigation techniques and navigation systems as an alternative or adjunct to GPS and INS. However, these present types of image based navigation techniques and navigation systems are slow and inaccurate in comparison to GPS and INS and are thus not suitable as a navigation technique or system. There is thus a need for an improved image based navigation method and apparatus suitable as a navigation system and removing the above mentioned disadvantages. Accordingly, there remains a need for a faster image based navigation method and apparatus which provides the same or better accuracy than GPS or INS.

BRIEF SUMMARY

The present invention is defined by the appended independent claims. Various examples of the invention are set forth by the appended dependent claims as well as by the following description and the accompanying drawings.

With the above description in mind, then, an aspect of the present invention is to provide an improved image based navigation system providing position and orientation from correlated point features in images using an optimized fundamental matrix and a method that solves for both rotation and translation simultaneously which seeks to mitigate, alleviate, or eliminate one or more of the above-identified deficiencies in the art and disadvantages singly or in any combination.

The object of the present invention is to provide an inventive image based navigation method and apparatus where previously mentioned problems are partly avoided. This object is achieved by the features of claim 1 wherein, a method for determining position and orientation enabling navigation of an object using image data from at least a first and a second 2D image from at least one camera mounted on said object, characterized in that said method comprising the steps of: matching corresponding points in at least a first and a second 2D image; calculating a fundamental matrix by using corresponding image points from at least the first and the second 2D image; calculating and extracting estimated first rotation and translation values from the fundamental matrix using single value decomposition (SVD) based on information from at least the first and the second 2D image; iterating and determining final rotation and translation values by using the LevenBerg-Marquard algorithm; repeating previous steps for several images, resulting in information of the relative camera movement from image 1 to M, enabling navigation of said object. M is a number of images. The number M equals several images and may be any arbitrary number of images.

Said object is further achieved by the features of claim 5, wherein an apparatus for determining position and orientation enabling navigation of an object using image data from at least a first and a second 2D image from at least one camera mounted on said object, wherein said apparatus comprising: a memory; and a processor, characterized in that said memory is encoded with instructions that, when executed, cause the processor to receive input from at least two 2D images wherein the apparatus is capable of: matching corresponding points in at least a first and a second 2D image; calculating a fundamental matrix by using corresponding image points from at least a first and a second 2D image; calculating and extracting estimated first rotation and translation values from the fundamental matrix using single value decomposition (SVD) based on information from at least the first and the second 2D image; iterating and determining final rotation and translation values by using the LevenBerg-Marquard algorithm; repeating the previous steps for several images, resulting in information of the relative camera movement from image 1 to M, enabling navigation of said object.

According to a further advantageous aspect of the invention, said method comprises the step of correcting images from one or several cameras and from at least a first and a second 2D image for their respective radial distortion and other measurable effects which result in poor image precision.

According to a further advantageous aspect of the invention, where said method to determine the position and orientation of said object is based on information of the position of the imaged item.

According to a further advantageous aspect of the invention, where said method to determine the position and orientation of said object is based on information of the start position of the object.

According to a further advantageous aspect of the invention, said apparatus is capable of correcting images from one or several cameras and from at least a first and a second 2D image for their respective radial distortion and other measurable effects which result in poor image precision.

According to a further advantageous aspect of the invention, said apparatus is capable of determining the position and orientation of said object based on information of the position of imaged item.

According to a further advantageous aspect of the invention, said apparatus is capable of determining the position and orientation of said object based on information of the start position of the object.

According to a further advantageous aspect of the invention, a computer-readable medium have computer executable instructions for performing the method of the present invention.

Any of the advantageous features of the present invention above may be combined in any suitable way.

A number of advantages are provided by means of the present invention, for example:
- a fast and the same or a more accurate system than a GPS/INS system based on one or several cameras is allowed;
- a solution is allowed which is not sensitive to perspective changes;
- a solution is provided which could be implemented by using processors/FPGA technique or other hardware;

BRIEF DESCRIPTION OF THE FIGURES

The present invention will now be described in detail with reference to the figures, wherein.

DETAILED DESCRIPTION OF VARIOUS EMBODIMENTS

Examples of the present invention relate, in general, to the field of navigation and epipolar geometry, in particularly, to methods and apparatus for guiding and providing navigation to an object using image data based on information from at least a first and second 2D image.

Examples of the present invention will be described more fully hereinafter with reference to the accompanying drawings, in which examples of the invention are shown. This invention may, however, be embodied in many different forms and should not be construed as limited to the examples set forth herein. Rather, these examples are provided so that this disclosure will be thorough and complete, and will fully convey the scope of the invention to those skilled in the art. Like reference signs refer to like elements throughout.

All the FIGS. 1 to 7 are schematically illustrated.

Epipolar Geometry

Figure 1:
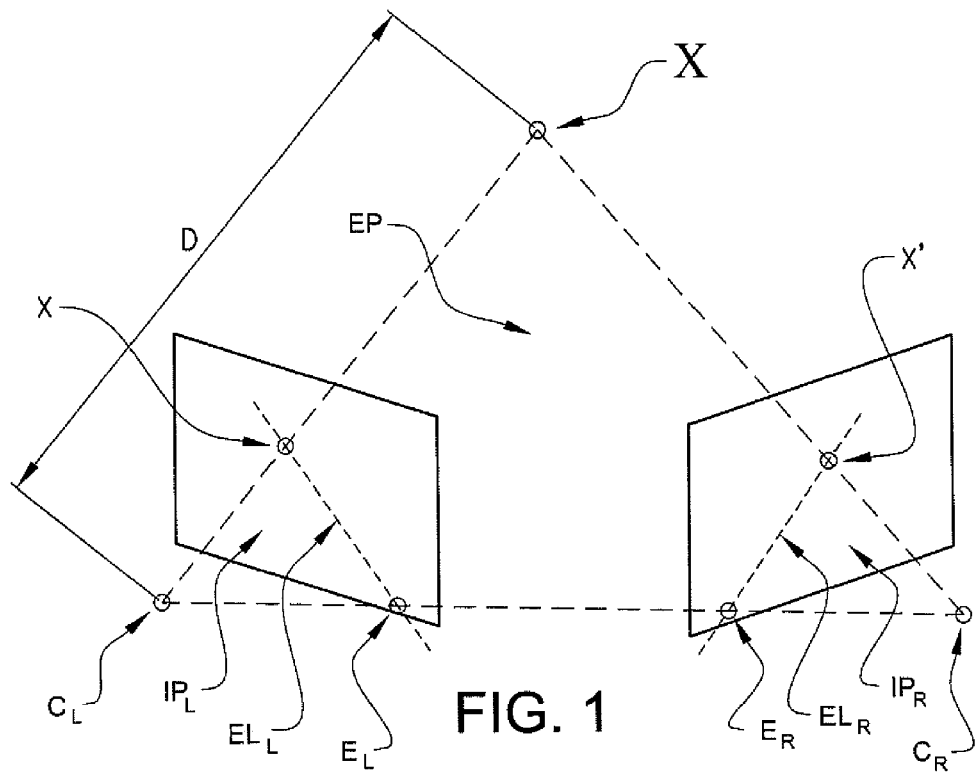
FIG. 1 schematically shows a pictorial representation of the epipolar geometry.

FIG. 1 shows an example of two cameras taking a picture of the same scene from different points of views. The epipolar geometry then describes the relation between the two resulting views. The epipolar geometry is the intrinsic projective geometry between two views, or images. It is independent of scene structure, and only depends on a camera's internal parameters and relative pose. Epipolar geometry is a fundamental constraint used when images of a static scene are to be registered. When two cameras view a 3D scene from two different positions, there are a number of geometric relations between the 30 points and their projections onto the 2D images that lead to constraints between the image points. This generalized constraint, called epipolar constraint, can be used to estimate relative motion between two images. The epipolar constraint can be written as $$x'^T F x = 0 \quad \text{[Equation 1]}$$

where, x and x' are the homogeneous coordinates of two corresponding points in the two images, and F is the fundamental matrix. The homogeneous coordinates x and x' are vectors. The homogeneous coordinate $x'^T$ in equation 1 is the transpose of the homogeneous coordinate x'.

Epipolar geometry is the geometry of computer stereo vision. Computer stereo vision is the extraction of 3D information from digital images, such as obtained for example by a camera or a video camera. The camera may be a CCD camera and the images may constitute a video sequence. By comparing information about a scene from several camera perspectives, 3D information may be extracted by examination of the relative perspectives. As previously mentioned, when two cameras view a 3D scene from two different positions, there are a number of geometric relations between the 3D points and their projections onto the 2D images that lead to constraints between the image points. These relations are derived based on the assumption that the camera or cameras can be approximated by the pinhole camera model. The pinhole camera model describes the mathematical and geometric relationship between a 3D point and its 2D corresponding projection onto the image plane In the epipolar geometry, the relation between two images provided from different cameras may be explained with a correspondence of a point to a line, rather than a correspondence of a point to a point. It could also be the same camera taking images from different views. FIG. 1 shows the epipolar geometry, that for a point in one image, there is a corresponding point in the other image where the two points are the projections of the same physical point in 3D space, the original 3D space point. These two points are normally called correspondence points or corresponding points. The original 3D space point is a point positioned on an item which is imaged by the camera. A plane made by a point in 3D space X, and a first camera $C_L$, left camera, and a second camera $C_R$, right camera, is called an epipolar plane EP. The intersection line of the epipolar plane EP and the image plane are called an epipolar line. FIG. 1 shows, a left image plane $IP_L$ and a left epipolar line $EL_L$ and also a right image plane $IP_R$ and a right epipolar line $EL_R$. The intersection point made by the image plane and the line linking the two cameras $C_L$ and $C_R$ is called epipole. Referring to FIG. 1, the points $E_L$ and $E_R$ are the epipoles. All epipolar lines intersect at the epipole regardless of where the 3D space point X is located. An epipolar plane EP intersects the left and right image planes $IP_R$, $IP_L$ in the left and right epipolar lines $EL_L$, $EL_R$ and defines the correspondence between the lines. FIG. 1 show, a distance D relating to the distance from the first camera through the image point.

For a point in one image, the corresponding point in the second image is constrained to lie on the epipolar line. This means that for each point which is observed in one image the same point must be observed in the other image on a known epipolar line. This provides the epipolar constraint relation which corresponding image points must satisfy and it means that it is possible to test if two points really correspond to the same 3D point in space. Epipolar constraints can also be described by the essential matrix E or the fundamental matrix F. The essential matrix is a 3×3-matrix and has rank 2. The essential matrix has 5 degrees of freedom, 3 for rotation and 2 for translation. Both the fundamental matrix and the essential matrix can be used for establishing constraints between matching image points. However, the essential matrix can only be used in relation to calibrated cameras since the intrinsic parameters, i.e. the internal camera parameters, must be known when using the essential matrix. The essential matrix only encodes information of the extrinsic parameters i.e. the external camera parameters which are rotation R and direction of translation T from one camera to the other. The extrinsic parameters determine the cameras orientation towards the outside world. Rotation and translation are the external parameters which signify the coordinate system transformations from 3D world coordinates to 3D camera coordinates. The rotation and translation parameters define the position of the camera center and the camera's heading in world coordinates. If the cameras are calibrated, the essential matrix can be used for determining both the relative position and orientation between the cameras and the 3D position of corresponding image points. The fundamental matrix encodes information of both the extrinsic parameters and the intrinsic parameters. The fundamental matrix encapsulates the epipolar geometry and will be further described below.

Fundamental Matrix

The fundamental matrix contains all available information of the camera geometry and it can be computed from a set of correspondence points. The fundamental matrix defines the geometry of the correspondences between two views, or images, in a compact way, encoding intrinsic camera geometry as well as extrinsic relative motion between two cameras. The fundamental matrix is a homogeneous 3×3-matrix, entity of 9 parameters, and is constrained to have a rank 2. The fundamental matrix has seven degrees of freedom. If a point in 3-D-space X is imaged as x in the first image (left image in FIG. 1), and as x' in the second image (right image in FIG. 1), then the image points satisfy the relation of equation 1.

F is the fundamental matrix and can be estimated linearly from equation 1, given a minimum of 8 correspondence points between two images. 8 correspondence points results in 8 points in the first image and 8 points in the second image, giving a total number of 16 points. The fundamental matrix is the algebraic representation of epipolar geometry, independent of scene structure and can be computed from correspondences of imaged scene points alone, without requiring knowledge of the cameras' internal parameters or relative pose.

Estimating the fundamental matrix is crucial for structure and motion problems where information, such as when the location of the camera and 3D scene is retrieved from several images. Estimating the fundamental matrix is vital for image based navigation and since the fundamental matrix contains the internal camera parameters and the rigid transformation between two cameras, it is also used in a number of different areas such as video tracking, stereo matching, image rectification and restoration, object recognition, outlier detection and motion estimation.

A set of correspondence points between two images will always contain noise and outliers. Outliers refer to anomalies, or errors, in a given data set. It is an outlying observation that appears to deviate markedly from an optimal or accurate solution. The outliers may come from extreme values of noise or from erroneous measurements or incorrect hypotheses about the interpretation of data. Outliers may also be defined as data that do not fit the model. In order to estimate an accurate solution, it is preferable to find a solution without deviations and anomalies in the data set, i.e. outliers. Thus, based on a predetermined criterion, outliers are false feature correspondences.

Correct feature correspondences are called inliers and they result in an accurate solution. Inliers may also be defined as data whose distribution can be explained by some set of model parameters. The fundamental matrix can be estimated from the information of the correspondence points and in order to achieve an accurate and precise fundamental matrix, it is important to minimize the effect and influence of outliers. The fundamental matrix is sensitive to anomalies, or errors, in the corresponding points. Thus, it is essential to select inliers for a precise and accurate fundamental matrix.

The methods and algorithms used for estimating the fundamental matrix are linear method, iterative method, and robust method.

For a specific method of obtaining an accurate fundamental matrix which will be further disclosed, a linear method is used in order to first estimate an initial fundamental matrix and eventually an accurate fundamental matrix. The eight-point algorithm is used when estimating an initial fundamental matrix. The eight-point algorithm is fast and easily implemented. The eight-point algorithm is used in the specific method of obtaining an accurate fundamental whether only eight corresponding points or more than eight corresponding points are used. When using eight or more than eight correspondence points, eight-point algorithm together with single value decomposition (SVD) with Frobenius norm is used in the specific method of obtaining an accurate fundamental in order to calculate an initial fundamental matrix. The SVD minimizes the Frobenius norm so that the rank of the resulting matrix is 2. SVD is an important factorization of a rectangular real or complex matrix, with many applications in, for example, signal processing and statistics. Applications which employ the SVD include computing the pseudoinverse, least squares fitting of data, matrix approximation, and determining the rank, range and null space of a matrix. Frobenius norm is a matrix norm which is a natural extension of the notion of a vector norm to matrices. The method of obtaining an accurate fundamental matrix provides a solution that combines the linear method, the iterative method and the robust method rejecting models containing outliers.

The iterative method used in the proposed method and apparatus for obtaining an accurate fundamental matrix are based on optimizing and finding a lesser geometrical projection error between the correspondence points than earlier iterations or than a threshold value. The number of iterations may vary. Criteria's for the number of iterations made in the present invention may be a time constraint and/or a threshold value and/or a pre-determined value representing the amount of iterations.

Further, random sample consensus (RANSAC) is used for obtaining an accurate fundamental matrix. RANSAC is an iterative method used to estimate parameters of a mathematical model from a set of observed data which contains outliers. RANSAC has the ability to do robust estimation of the model parameters, i.e., it can estimate the parameters with a high degree of accuracy even when significant amount of outliers are present in the data set. RANSAC produces a reasonable result with a certain probability. This probability is increasing as more iterations are allowed. RANSAC also assumes that, given a set of inliers, there exists a procedure which can estimate the parameters of a model that optimally explains or fits this data.

A fundamental matrix obtained may then be used for correspondence of all feature points between the two images.
External Camera Parameters (Rotation R and Translation T)

Figure 2:
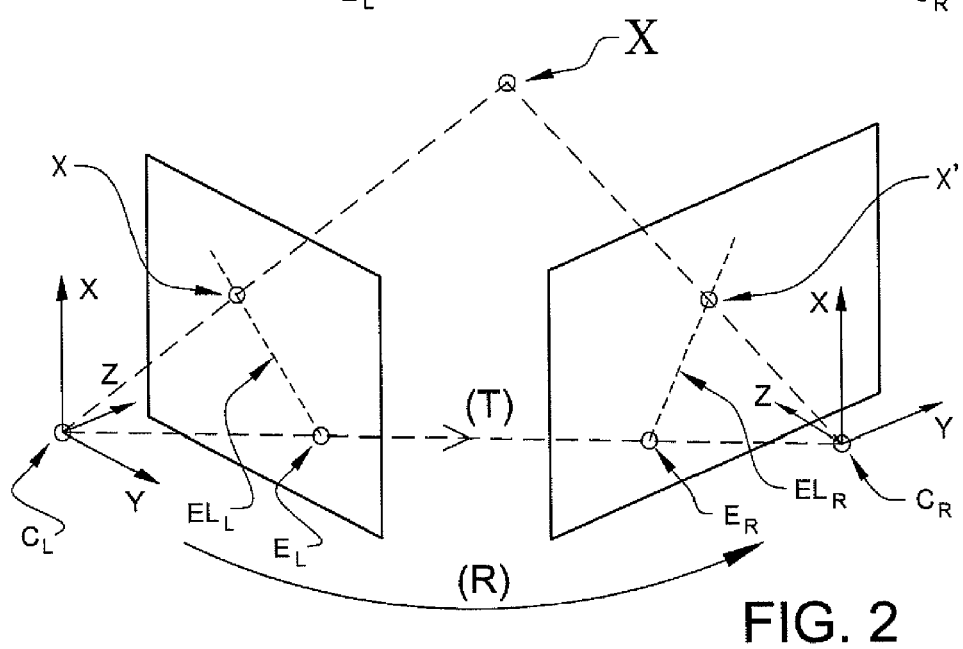
FIG. 2 schematically shows a pictorial representation of the epipolar geometry.

When the fundamental matrix F and the internal camera parameters are known we can solve the external camera parameters (rotation and translation) and determine 3D structure of a scene. The external parameters determine the cameras orientation towards the outside world. R is the 3×3 rotation matrix and T is the 1×3 translation vector. Referring to FIG. 2, if the left camera $C_L$ represents a global frame of reference in which objects exist (world frame), then the other camera $C_R$ is positioned and orientated by a Euclidean transformation (rotation R, translation T). FIG. 2, schematically shows a pictorial representation of the coordinate x in the first image taken by camera $C_L$ and the coordinate x' in the second image taken by camera $C_R$ of a 3d space point. The two coordinates x and x' in the first and the second image in FIG. 2 may be taken by two different cameras or with the same camera.

Figure 3:
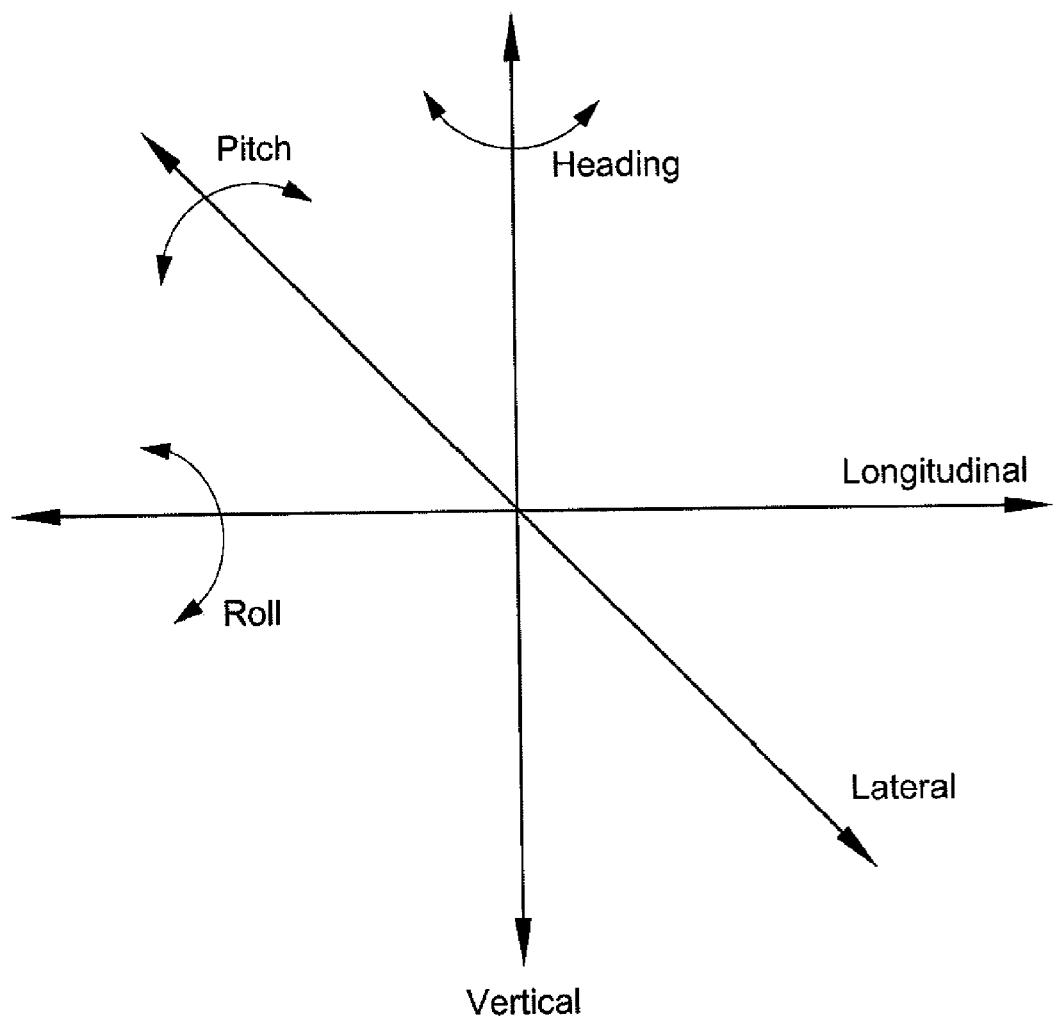
FIG. 3 schematically shows a pictorial representation of three translation axes and the rotation around them.

The essential matrix can be determined from the fundamental matrix and the camera calibration 3×3 matrix K. K is also called projection matrix and represents the intrinsic parameters of the camera. In order to determine rotation and translation from one camera to the other camera, or one image to the other, the rotation and translation can be determined by factoring the essential matrix with single value decomposition (SVD) to 4 different possible combinations of translations and rotations. One of these combinations is correct. By looking at their geometric interpretation we may determine which of these combinations are correct. FIG. 3 shows how a camera may be rotated around three different axes which are the longitudinal axis, the lateral axis and the vertical axis. The rotation around these axes is called roll, heading (yaw) and pitch. The rotation and translation components are extracted from the essential matrix and then the 3D point locations can be determined.

One Embodiment of the Present Invention

A method and apparatus are provided in this detailed disclosure which uses refined and more accurate algorithms for calculating the fundamental matrix F and from this calculating a more accurate rotation and translation enabling navigation. Rotation and translation between images are calculated and several images are matched in the above resulting in a relative camera movement from image 1-M. M may be any arbitrary amount of images. In the embodiment of the present invention, the method is computer-implemented. The computer-implemented method can be realized at least in part as one or more programs running on a computer as a program executed from a computer-readable medium such as a memory by a processor of a computer. The programs are desirably storable on a machine-readable medium such as a floppy disk or a CD-ROM, for distribution and installation and execution on other computers. Further, the computer-implemented method can be realized at least in part in hardware by using a programmable array in a processor/FPGA technique or other hardware.

In order to determine the position and orientation of an object and enabling navigation, the present method and apparatus uses image data from at least a first and a second 2D image from at least one camera mounted on an object.

Figure 4:
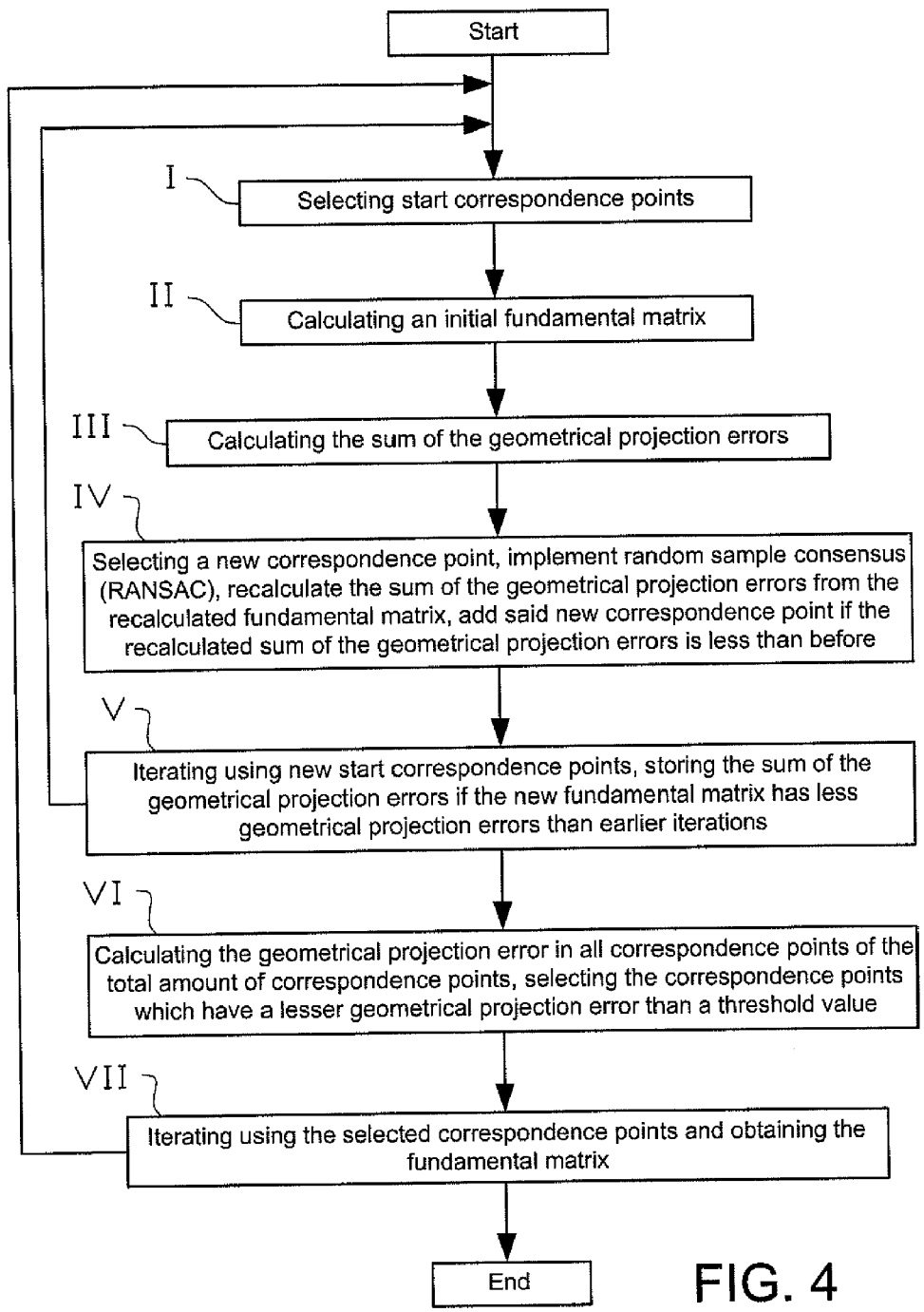
FIG. 4 schematically shows a pictorial representation of a flow chart for the process of determining the fundamental matrix according to the present invention.

In order to minimize the number of outliers and to provide an accurate fundamental matrix, the present method and apparatus may use the geometrical projection errors of the correspondence points to choose the fundamental matrix with minimized outliers and the least error. FIG. 4 schematically shows a flowchart of a specific method of obtaining an accurate fundamental matrix. This specific method of obtaining an accurate fundamental matrix starts with first, selecting a number of at least 8 start correspondence points (step I). The pairs of at least 8 corresponding start points may be selected in a normal distribution random manner. The pairs of at least 8 corresponding start points may be randomly selected.

Then, an initial fundamental matrix is calculated from the eight-point method and single value decomposition (SVD) with normalized frobenius norm (step II). The number of start correspondence points which is selected in order to obtain an initial fundamental matrix in steps (I) and (II) is preferably in the range of 12 to 15. Selecting start correspondence points in the range of 12 to 15 provides a robust and statistically good start for obtaining an accurate fundamental matrix.

Figure 5:
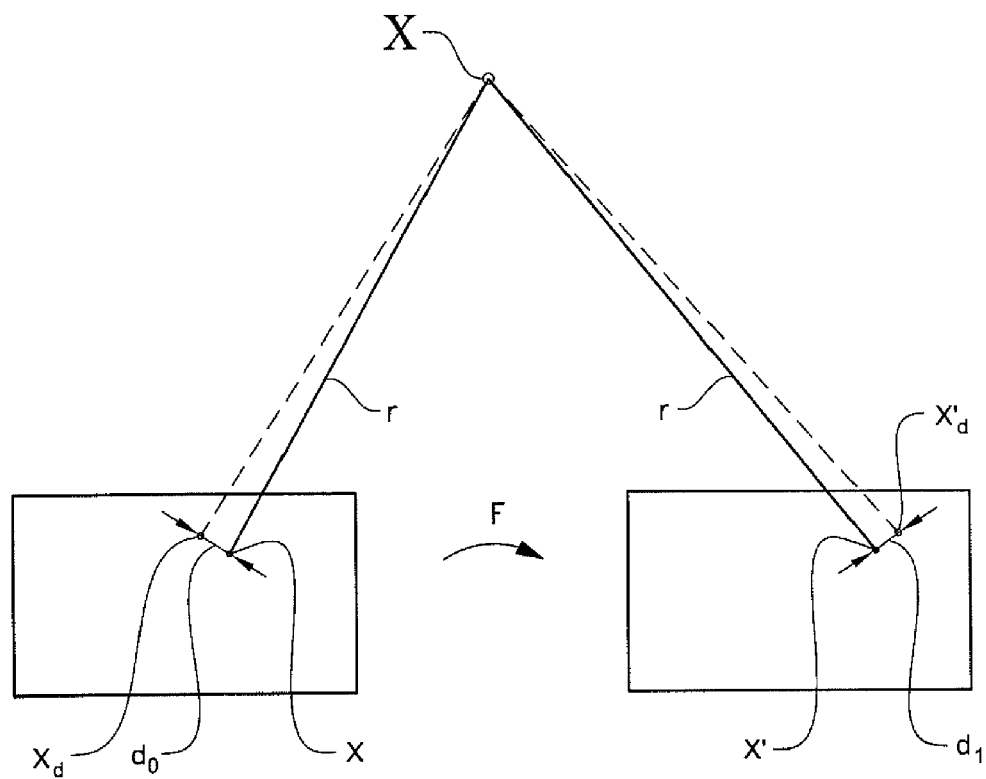
FIG. 5 schematically shows a pictorial representation of the geometrical projection error.

Then, the sum of the geometrical projection errors of said start correspondence points from said initial fundamental matrix is calculated (step III). FIG. 5 shows a point X in 3D space imaged as x in a first image and as x' in a second image. In order to receive the geometrical projection error, the point x in the first image is projected to the second image as x'$_d$ and the point x' in the second image is projected to the first image as x$_d$. The projection is done using the fundamental matrix in combination with SVD. FIG. 5 further show the error distance $d_0$ being the distance between x and x$_d$ and the error distance $d_1$ being the distance between x' and x'$_d$. The error distances $d_0$ and $d_1$ result in the geometrical projection error d of the corresponding points. The error distances $d_0$ and $d_1$ is the orthogonal distance between x and x$_d$; and x' and x'$_d$ respectively. The geometrical projection error d is determined by the following equation:

$$d=\sqrt{d_0^2+d_1^2} \qquad \text{[Equation 3]}$$

The sum of the geometrical projection errors of said start correspondence points is calculated by first calculating an estimate of each 3D point's location for said fundamental matrix F and for each pair of correspondence points which results in an estimated 3D coordinate for each pair of correspondence points. This may be done by using SVD or a cross product resulting in a calculated coordinate in 3D for each pair of correspondence points where each points respective rays r, shown in FIG. 5, intersect with each other. Then, calculate the geometrical projection error of said projected 3D coordinate, using the homography of said fundamental matrix. Finally, summarize the geometrical projection errors and divide the total sum with a number which represents the amount of correspondence points. The sum of the geometrical projection errors from said initial fundamental matrix is now obtained. The projected geometrical error is later used in the random sample consensus (RANSAC) to determine an error of each correspondence point. By using the estimated projected geometrical error, the errors are made clear and protrude like spikes in a distance error graph between a first and a second image whereas outliers are easily detected. Enabling greater quantifiable boundaries between inliers and outliers and the number of outliers can be minimized.

Then, select a new correspondence point, using random sample consensus (RANSAC), recalculate the fundamental matrix with said new correspondence point, recalculate the sum of the geometrical projection errors from the recalculated fundamental matrix and add said new correspondence point if the recalculated sum of the geometrical projection errors is less than before (step IV).

Then, iterate step I-IV using new start correspondence points, until a pre-determined iteration value N is obtained, store the sum of the geometrical projection errors of said new start correspondence points and the corresponding new fundamental matrix if the new fundamental matrix has less geometrical projection errors than earlier iterations (step V). New start correspondence points may be selected in a normal distribution random manner. The new start correspondence points may be randomly selected. Criteria's for the number of iterations made in step V may be a time constraint and/or a pre-determined amount of iterations. The number of iterations made in step V depends on the pre-determined iteration value N. The number of iterations, i.e. the pre-determined iteration value N, may vary depending on a time constraint or a selected and pre-determined number of iterations. The number of iterations which shall be done in the present invention may be set to a pre-determined amount of iterations, such as for example 10 iterations or 100 iterations or 1000 iterations. The number of iterations may be set to a pre-determined number based on the number of sample points n, i.e. correspondence points. The pre-determined iteration value N in step V may be a pre-determined number of iterations determined by the following equation:

$$N=n^2 \quad \text{[Equation 2]}$$

where n is the number of the sample points, i.e. corresponding points. Further, the pre-determined iteration value N in step V may be a pre-determined number of iterations determined by the following equation:

$$N=n \log n \quad \text{[Equation 4]}$$

where n is the number of the sample points, i.e. corresponding points. Further, a time constraint may be used to regulate the number of iterations performed in step V. The time constraint may be set to any appropriate time, such as 5 seconds or 10 seconds. The iteration in step V is completed either when a pre-determined number N of iterations are obtained or when a pre-determined iteration time is obtained. The pre-determined number of iterations or the pre-determined iteration time corresponds to the pre-determined iteration value in step V. A great number of points, for example 1000 or several 1000 points, may be stored which results in less error per number of included sample, i.e. correspondence points. This since the sum of the errors is divided with a number which represents the amount of correspondence points. Thus, the more points stored the less error per number of included samples.

Then, calculate the geometrical projection error in all correspondence points of the total amount of correspondence points and select the correspondence points which have a lesser geometrical projection error than a threshold value (step VI). The threshold value may be used to regulate the number of iterations in step VII and depends on the accuracy of the corresponding measurements of the corresponding points. The threshold value is an accuracy constraint used for the calculated geometrical projection error and may be set to any appropriate value The threshold value is preferably a value less than a tenth of a pixel dimension size. The pixel dimension size is the height and the width of one pixel in an image. The pixel dimension size is the horizontal and vertical measurements of one pixel in each dimension in an image expressed in pixels. Further, the threshold value may be determined by the following equation:

$$TV=2/h \quad \text{[Equation 5]}$$

where, TV is the threshold value and h is the height of one pixel in the image. Further, the threshold value may be determined by the following equation:

$$TV=2/w \quad \text{[Equation 6]}$$

where, TV is the threshold value and w is the width of one pixel in the image.

Finally, iterate step I-VI using said selected correspondence points which have a lesser geometrical projection error than a threshold value and obtain the fundamental matrix. Steps I-VI are iterated and repeated recursively and successively with lower threshold values until the number of correspondence points is stable and no correspondence points are removed and thereby obtaining the fundamental matrix (step VII). By repeating the steps I-VI the method of obtaining a fundamental matrix starts from the first step I, with a lesser amount of points which are statistically better. Most of the outliers are removed and also the points which have a lesser geometrical projection error and that does not match are removed. By recursively and successively repeating the method for obtaining an accurate fundamental matrix with different threshold values, an accurate and precise fundamental matrix is obtained until for example no points are removed. Thus, the method for obtaining a fundamental matrix can be optimized by controlling different parameters such as a threshold value or a significance value of points. Since the method for obtaining a fundamental matrix does not start with the first best solution in the beginning of the method it allows a great number of points to be included in providing a robust method with a stable convergence for obtaining an accurate fundamental matrix.

The fundamental matrix used in the present invention may also be obtained by any other type of method for estimating the fundamental matrix, preferably the method described above.

Figure 6:
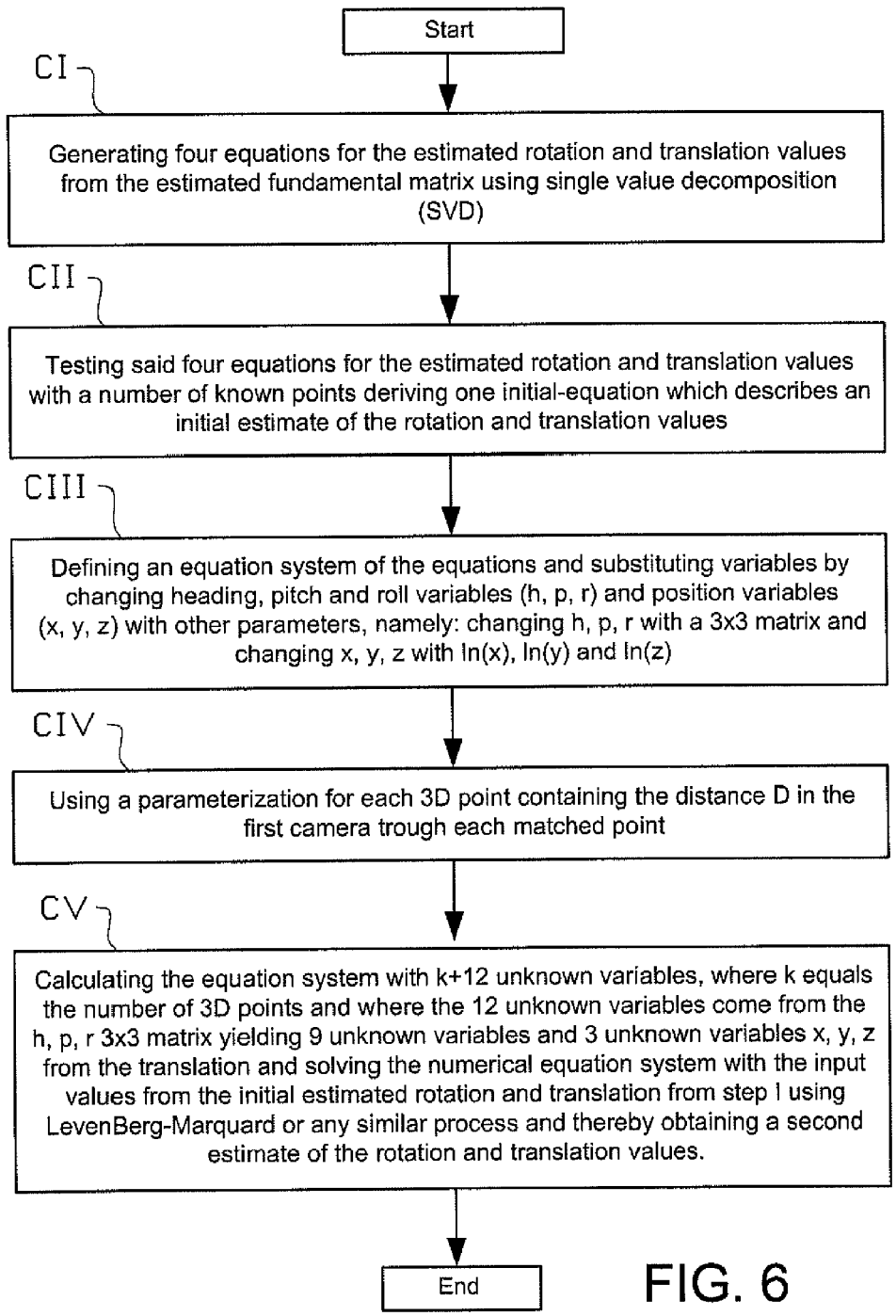
FIG. 6 schematically shows a pictorial representation of a flow chart for the process of determining the position and attitude of at least one camera.

FIG. 6 schematically shows a flowchart of a specific method or obtaining rotation and translation values. This specific method for determining the position and attitude of at least one camera by calculating and extracting the estimated rotation and translation values from an estimated fundamental matrix based on information from at least a first and second 2D image is preferably used in the present invention, however any other type of method for determining the position and attitude of at least one camera by calculating and extracting the estimated rotation and translation values may be used in the present invention. The preferred specific method for determining the position and attitude of at least one camera starts with first, generating four equations for the estimated rotation and translation values from the estimated fundamental matrix using single value decomposition (SVD) (step CI).

Then, test said four equations for the estimated rotation and translation values with a number of known points deriving one initial-equation which describes an initial estimate of the rotation and translation values (step CII). This initial-equation clearly and unambiguously describes a first initial estimate of rotation and translation.

Then, define an equation system of the equations and substitute variables by changing heading, pitch and roll variables (h, p, r) and position variables (x, y, z) with other parameters, namely: changing h, p, r with a 3×3 matrix and changing x, y, z with ln(x), ln(y) and ln(z) (step CIII). Heading h, pitch p and roll r normally have weak derivatives which results in poor and slow convergence. The translation (x, y, z) normally also have weak derivatives which result in poor and slow convergence close to zero which may provide an instability between the translation and rotation. In mathematics, a weak derivative is a generalization of the concept of the derivative of a function (strong derivative) for functions not assumed differentiable, but only integrable. Further, weak derivatives do not converge as fast as strong derivatives.

The changing and substitution of the variables in the preferred specific method for determining the position and attitude of at least one camera provides stronger derivatives and faster convergence. When changing and substituting the heading, pitch and roll variables (h, p, r) with a 3×3 matrix, i.e. with 9 variables, the heading, pitch and roll variables are further determined by adding to the equations, that each column shall have the magnitude=1 yielding three equations, that the columns in the matrix are orthogonal yielding three equations and that the scale for a specific distance D given a known point is constant yielding one equation. The derivative for rotation R is higher than the derivative for translation T. The substitution of the translation variables (x, y, z) with ln(x), ln(y) and ln(z) with derivatives of 1/x, 1/y and 1/z are provided and this provides strong derivatives for small values of (x, y, z) which then results in a faster convergence for the translation than for the rotation. This adds to balance the derivatives between translation and rotation resulting in that the rotation and the translation variables have equivalent effect in the determination of the position and attitude of at least one camera, resulting in a more accurate estimate of the rotation and translation. This also results in a solution which is less sensitive to perspective changes. The convergence of the translation is faster after the substitution of the translation variables (x, y, z) to ln(x), ln(y) and ln(z). The preferred specific method for determining the position and attitude of at least one camera, containing the substitution of the translation variables (x, y, z) to ln(x), ln(y) and ln(z) provides a solution which includes a faster convergence than before. Without this variable substitution the rotation would have greater effect than the translation in the determination of the position and attitude of at least one camera, providing unstable and uncertain solutions not necessarily converging fastly or to a correct solution.

Then, use a parameterization for each 3D point containing the distance D in the first camera trough each matched point (step CIV). A point is clearly and unambiguously described in 3D with only one parameter which relates to the distance D from the first camera trough the image point. The distance D, shown in FIG. 1, provides depth in the image.

Finally, calculate the equation system with k+12 unknown variables, where k equals the number of 3D points and where the 12 unknown variables come from the h, p, r 3×3 matrix yielding 9 unknown variables and 3 unknown variables x, y, z from the translation by solving the numerical equation system with the input values for the estimated rotation and translation from step CI using LevenBerg-Marquard or any similar process, thereby obtain a final estimate of the rotation and translation values (step CV). By iterating LevenBerg-Marquard or any similar process a final estimate of the rotation and translation values with a predefined accuracy is obtained. The final estimate is an accurate estimation of the rotation and translation values of the movements of the camera, i.e. the position and attitude of the camera.

An apparatus may output the position and attitude for the at least one camera (step CVI) in order to find position and orientation for the camera.

The rotation and translation values used in the present invention may also be obtained by any other type of method for estimating the rotation and translation values, preferably the method described above.

Figure 7:
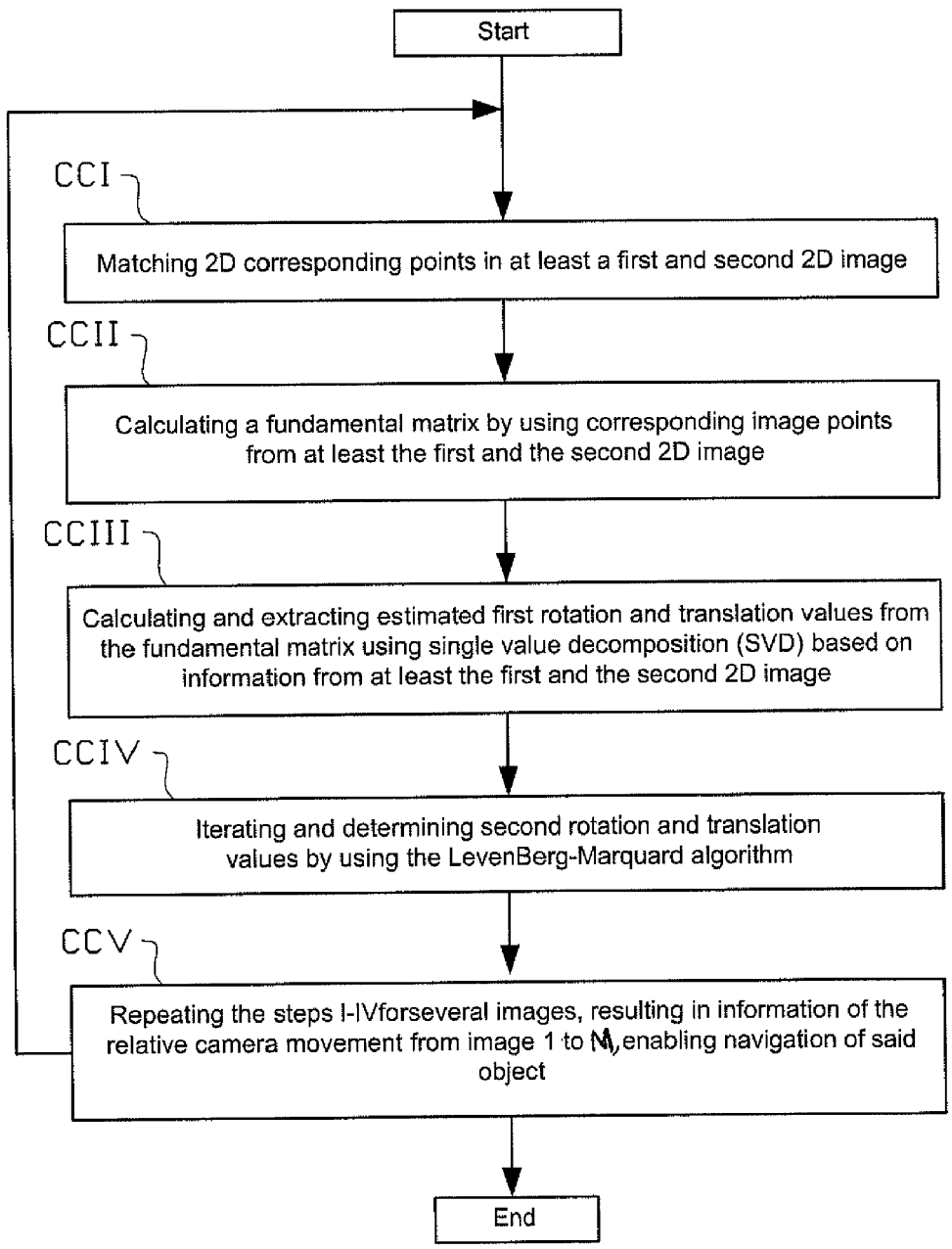
FIG. 7 schematically shows a pictorial representation of a flow chart for the process of image based navigation.

FIG. 7 schematically shows a flowchart of a specific method according to the present invention. Hereinafter, referring to FIG. 7, the method of the present invention is explained in detail.

First, corresponding points in at least a first and a second 2D image are matched (step CCI). The images from one or several cameras and from at least a first and a second 2D image may be corrected for their respective radial distortion and other measurable effects which result in poor image precision. This compensation and correction is done before matching the corresponding points in at least a first and a second 2D image. The correction of the images before the corresponding point feature matching depends on the accuracy and precision on the camera or cameras used. The need for correcting the images before the point feature matching is less if and when a camera with high accuracy and precision is used. Thus, the compensation and correction of the images may be done in any hardware or adapted software or alternatively when cameras needing negligible correction are used. Errors such as errors in the lens of the one or several cameras or, errors in the CCD sensor in the one or several cameras may cause the distortion. The correction and compensation is done to compensate the distortion of the different optical effects in one or several cameras. The matching of the corresponding points from the original point in 3D space may be done by using methods and algorithms such as SURF, FAST, Canny-Deriche, SUSAN or Harris. Preferably, SURF or FAST methods are used for the point matching.

Then, a fundamental matrix is calculated and estimated by using corresponding image points from at least the first and the second 2D image (step CCII). The method of obtaining the fundamental matrix which is described in relation to FIG. 4 is preferably used.

Then, the estimated first rotation and translation values are calculated and extracted from the fundamental matrix using single value decomposition (SVD) based on information from at least the first and the second 2D image (step CCIII). Then, final rotation and translation values are determined by iterating and using the LevenBerg-Marquard algorithm (step CIV). The method of calculating rotation and translation values which is described in relation to FIG. 6 is preferably used, providing very good convergence and accurate estimation of the rotation and translation values.

Finally, by repeating the steps I-IV for several images, resulting in information of the relative camera movement from image 1 to M will enable navigation of the object (step CCV). M is an arbitrary number of images. The number M represents the last image read or inputted and then used in the present invention. The steps CCI to CCV may be connected from reading and inputting images to the calculation of translation and rotation between these read and inputted images. Several images after one another and between each other are in this manner matched and the relative movement of a camera is provided.

Further, position information of the imaged item in the images taken by at least one camera may be used to determine the position and orientation of an object comprising at least one camera. The position information of the imaged item may be used to provide the information of the relative camera movements in relation to the known navigational information of the imaged item. The start navigational position information of an object comprising at least one camera may also be used to provide the information of the relative camera movements, enabling navigation of said object.

The present invention may be used for any type of navigation and the apparatus may be a portable device providing navigational information replacing GPS and this portable device may be used in military or civilian combat training. The apparatus may be mounted on any type of object. The object can constitute any type of land-, sea or air based object. The object can constitute a vehicle in the form of, for example, a helicopter, a tank, a track-mounted vehicle, a truck or other wheeled vehicle. The object can, for example, further constitute an infantry training participant. The proposed method and apparatus may be correlated with positioning information, scale information and direction information in order to provide absolute navigation.

The views encapsulated by the fundamental matrix may be images from a camera, or images or a video sequence from a video camera.

The invention is not limited to the example described above, but may be modified without departing from the scope of the claims below.

The terminology used herein is for the purpose of describing particular examples only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred examples and modes of operation of the present invention. However, the invention should be regarded as illustrative rather than restrictive, and not as being limited to the particular examples discussed above. The different features of the various examples of the invention can be combined in other combinations than those explicitly described. It should therefore be appreciated that variations may be made in those examples by those skilled in the art without departing from the scope of the present invention as defined by the following claims.

The invention claimed is:

1. A method for determining position and orientation enabling navigation of an object using image data from at least a first and a second 2D image from at least one camera mounted on said object, said method comprising the steps of:
   I. matching corresponding points in at least a first and a second 2D image;
   II. calculating a fundamental matrix by using corresponding image points from at least the first and the second 2D image;
   III. calculating and extracting estimated first rotation and translation values from the fundamental matrix using singular value decomposition (SVD) based on information from at least the first and the second 2D image;
   IV. iterating and determining final rotation and translation values by using the LevenBerg-Marquard algorithm; and
   V. repeating the steps I-IV for several images, resulting in information of the relative camera movement from image 1 to M, enabling navigation of said object;
   wherein the step of calculating said fundamental matrix comprises the sub-steps of:
      a. selecting start correspondence points;
      b. calculating an initial fundamental matrix;
      c. calculating the sum of the geometrical projection errors;
      d. selecting a new correspondence point, implement random sample consensus (RANSAC), recalculate the sum of the geometrical projection errors from the recalculated fundamental matrix, add said new correspondence point if the recalculated sum of the geometrical projection errors is less than before;
      e. iterating using new start correspondence points, storing the sum of the geometrical projection errors if the new fundamental matrix has less geometrical projection errors than earlier iterations;
      f. calculating the geometrical projection error in all correspondence points of the total amount of correspondence points, selecting the correspondence points which have a lesser geometrical projection error than a threshold value; and
      g. iterating using the selected correspondence points and obtaining the fundamental matrix.

2. The method according to claim 1, wherein said method comprises the step of correcting and compensating the distortion caused by one or several cameras.

3. The method according to claim 1, wherein determining the position and orientation of said object is based on information of the position of the imaged item.

4. The method according to claim 1, wherein determining the position and orientation of said object is based on information of the start position of the object.

5. An apparatus for determining position and orientation enabling navigation of an object using image data from at least a first and a second 2D image from at least one camera mounted on said object, wherein said apparatus comprising:
   a processor; and
   a memory encoded with instructions that, when executed cause the processor to receive input from at least two 2D images, said processor being further configured for:
      I. matching corresponding points in at least a first and a second 2D image;
      II. calculating a fundamental matrix by using corresponding image points from at least a first and a second 2D image;
      III. calculating and extracting estimated first rotation and translation values from the fundamental matrix using singular value decomposition (SVD) based on information from at least the first and the second 2D image;

IV. iterating and determining final rotation and translation values by using the LevenBerg-Marquard algorithm; and
V. repeating the steps I-IV for several images, resulting in information of the relative camera movement from image 1 to M, enabling navigation of said object;
wherein said apparatus is further configured, in II, for calculating said fundamental matrix based on:
  a. selecting start correspondence points;
  b. calculating an initial fundamental matrix;
  c. calculating the sum of the geometrical projection errors;
  d. selecting a new correspondence point, implement random sample consensus (RANSAC), recalculate the sum of the geometrical projection errors from the recalculated fundamental matrix, add said new correspondence point if the recalculated sum of the geometrical projection errors is less than before;
  e. iterating using new start correspondence points, storing the sum of the geometrical projection errors if the new fundamental matrix has less geometrical projection errors than earlier iterations;
  f. calculating the geometrical projection error in all correspondence points of the total amount of correspondence points, selecting the correspondence points which have a lesser geometrical projection error than a threshold value; and
  g. iterating using the selected correspondence points and obtaining the fundamental matrix.

6. An apparatus according to claim 5, wherein said apparatus is capable of correcting and compensating the distortion caused by one or several cameras.

7. An apparatus according to claim 5, wherein said apparatus is capable of determining the position and orientation of said object based on information of the position of imaged item.

8. An apparatus according to claim 5, wherein said apparatus is capable of determining the position and orientation of said object based on information of the start position of the object.

9. A non-transitory computer program product comprising at least one computer-readable storage medium having computer-readable program code portions embodied therein, the computer-readable program portions comprising one or more executable portions configured for performing the method of claim 1.

* * * * *